(12) United States Patent
Bernat et al.

(10) Patent No.: US 11,334,382 B2
(45) Date of Patent: May 17, 2022

(54) TECHNOLOGIES FOR BATCHING REQUESTS IN AN EDGE INFRASTRUCTURE

(71) Applicant: Intel Corporation, Santa Clara, CA (US)

(72) Inventors: Francesc Guim Bernat, Barcelona (ES); Kshitij Doshi, Tempe, AZ (US); Suraj Prabhakaran, Schlosspark Strasse (DE); Ned M. Smith, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 186 days.

(21) Appl. No.: 16/563,175

(22) Filed: Sep. 6, 2019

(65) Prior Publication Data

US 2019/0394096 A1    Dec. 26, 2019

Related U.S. Application Data

(60) Provisional application No. 62/841,042, filed on Apr. 30, 2019.

(51) Int. Cl.
*H04L 12/66* (2006.01)
*H04L 12/24* (2006.01)
(Continued)

(52) U.S. Cl.
CPC ............ *G06F 9/4862* (2013.01); *G06F 9/455* (2013.01); *G06F 9/45533* (2013.01);
(Continued)

(58) Field of Classification Search
CPC .. G06F 16/2365; G06F 9/5033; G06F 9/5044; G06F 9/5072; G06F 9/5094; G06F 9/5077; G06F 9/5083; G06F 21/602; G06F 16/27; G06F 9/5027; G06F 2209/501; G06F 16/784; G06F 21/64; G06F 9/44594; G06F 9/5005; G06F 9/4843; G06F 9/4806; G06F 9/4881; G06F 2009/4557; G06F 9/502; H04L 9/0827; H04L 41/12; H04L 47/82; H04L 67/18; H04L 67/32; H04L 9/0637;
(Continued)

(56) References Cited

U.S. PATENT DOCUMENTS

| 2011/0154073 | A1* | 6/2011 | Wang | G06F 9/5094 713/320 |
| 2014/0282556 | A1* | 9/2014 | Fee | G06F 9/4843 718/101 |

(Continued)

*Primary Examiner* — Kevin T Bates
*Assistant Examiner* — Ranjan Pant
(74) *Attorney, Agent, or Firm* — Hanley, Flight & Zimmerman, LLC

(57) ABSTRACT

Technologies for batching requests in an edge infrastructure include a compute device including circuitry configured to obtain a request for an operation to be performed at an edge location. The circuitry is also configured to determine, as a function of a parameter of the obtained request, a batch that the obtained request is to be assigned to. The batch includes a one or more requests for operations to be performed at an edge location. The circuitry is also configured to assign the batch to a cloudlet at an edge location. The cloudlet includes a set of resources usable to execute the operations requested in the batch.

17 Claims, 13 Drawing Sheets

(51) Int. Cl.

| | |
|---|---|
| *H04L 12/911* | (2013.01) |
| *H04L 29/08* | (2006.01) |
| *G06F 9/48* | (2006.01) |
| *G06F 16/23* | (2019.01) |
| *H04L 9/06* | (2006.01) |
| *G06F 16/27* | (2019.01) |
| *H04L 9/32* | (2006.01) |
| *H04L 41/12* | (2022.01) |
| *H04L 47/70* | (2022.01) |
| *H04L 67/52* | (2022.01) |
| *H04L 67/60* | (2022.01) |
| *G06F 9/50* | (2006.01) |
| *G06F 21/60* | (2013.01) |
| *H04L 9/08* | (2006.01) |
| *G06F 11/30* | (2006.01) |
| *G06F 9/455* | (2018.01) |

(52) U.S. Cl.
CPC ............ *G06F 9/45558* (2013.01); *G06F 9/48* (2013.01); *G06F 9/485* (2013.01); *G06F 9/4806* (2013.01); *G06F 9/4843* (2013.01); *G06F 9/4856* (2013.01); *G06F 9/4881* (2013.01); *G06F 9/4893* (2013.01); *G06F 9/50* (2013.01); *G06F 9/505* (2013.01); *G06F 9/5005* (2013.01); *G06F 9/5033* (2013.01); *G06F 9/5044* (2013.01); *G06F 9/5061* (2013.01); *G06F 9/5072* (2013.01); *G06F 9/5077* (2013.01); *G06F 9/5083* (2013.01); *G06F 9/5088* (2013.01); *G06F 9/5094* (2013.01); *G06F 11/30* (2013.01); *G06F 16/2365* (2019.01); *G06F 16/27* (2019.01); *G06F 21/602* (2013.01); *H04L 9/0637* (2013.01); *H04L 9/0827* (2013.01); *H04L 9/3247* (2013.01); *H04L 12/66* (2013.01); *H04L 41/12* (2013.01); *H04L 47/82* (2013.01); *H04L 67/18* (2013.01); *H04L 67/32* (2013.01); *G06F 2009/4557* (2013.01); *G06F 2009/45562* (2013.01); *H04L 2209/38* (2013.01)

(58) Field of Classification Search
CPC . H04L 9/3247; H04L 2209/38; H04L 63/123; H04L 41/5009; H04L 9/3239; H04L 67/10; H04L 67/322; H04L 67/12; H04L 41/5019; H04L 67/1097; Y02D 10/00; H04W 4/029; H04W 4/44; H04W 28/24; H04W 36/32
See application file for complete search history.

(56) References Cited

U.S. PATENT DOCUMENTS

| | | | |
|---|---|---|---|
| 2016/0019317 A1* | 1/2016 | Pawar | ................... G06F 16/907 707/649 |
| 2017/0034012 A1* | 2/2017 | Douglas | ................. H04L 41/50 |
| 2017/0104838 A1* | 4/2017 | Busayarat | ............... H04L 67/32 |
| 2018/0007165 A1* | 1/2018 | Mathur | ................... H04L 67/02 |
| 2018/0024862 A1* | 1/2018 | Nakagawa | ................ G06F 9/50 718/104 |
| 2018/0300124 A1* | 10/2018 | Malladi | ............... H04L 12/2823 |
| 2019/0238427 A1* | 8/2019 | Guan | ................. H04L 41/0893 |

* cited by examiner

TECHNOLOGIES FOR BATCHING REQUESTS IN AN EDGE INFRASTRUCTURE

CROSS-REFERENCE TO RELATED APPLICATION

The present application claims the benefit of U.S. Provisional Patent Application No. 62/841,042, filed Apr. 30, 2019.

BACKGROUND

Edge computing and internet of things (IoT) are emerging paradigms in which computing is performed at an "edge" of a network (e.g., closer to users) to provide lower latency services (e.g., executing operations upon request) as compared to performing the services in a data center at the core of a network. Edge deployments typically include different cloudlets (e.g., sets of resources, such as processors, memory devices, data storage devices, accelerator devices, etc.) at various locations, referred to herein as "edge locations," such as at cell towers or street cabinets. Additionally, edge deployments include an edge gateway that directs different requests from user devices to the cloudlets. Generally, edge cloudlets are constrained in the degree to which they can scale, unlike data center clouds at the core of a network, due to limited computational resources and power.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
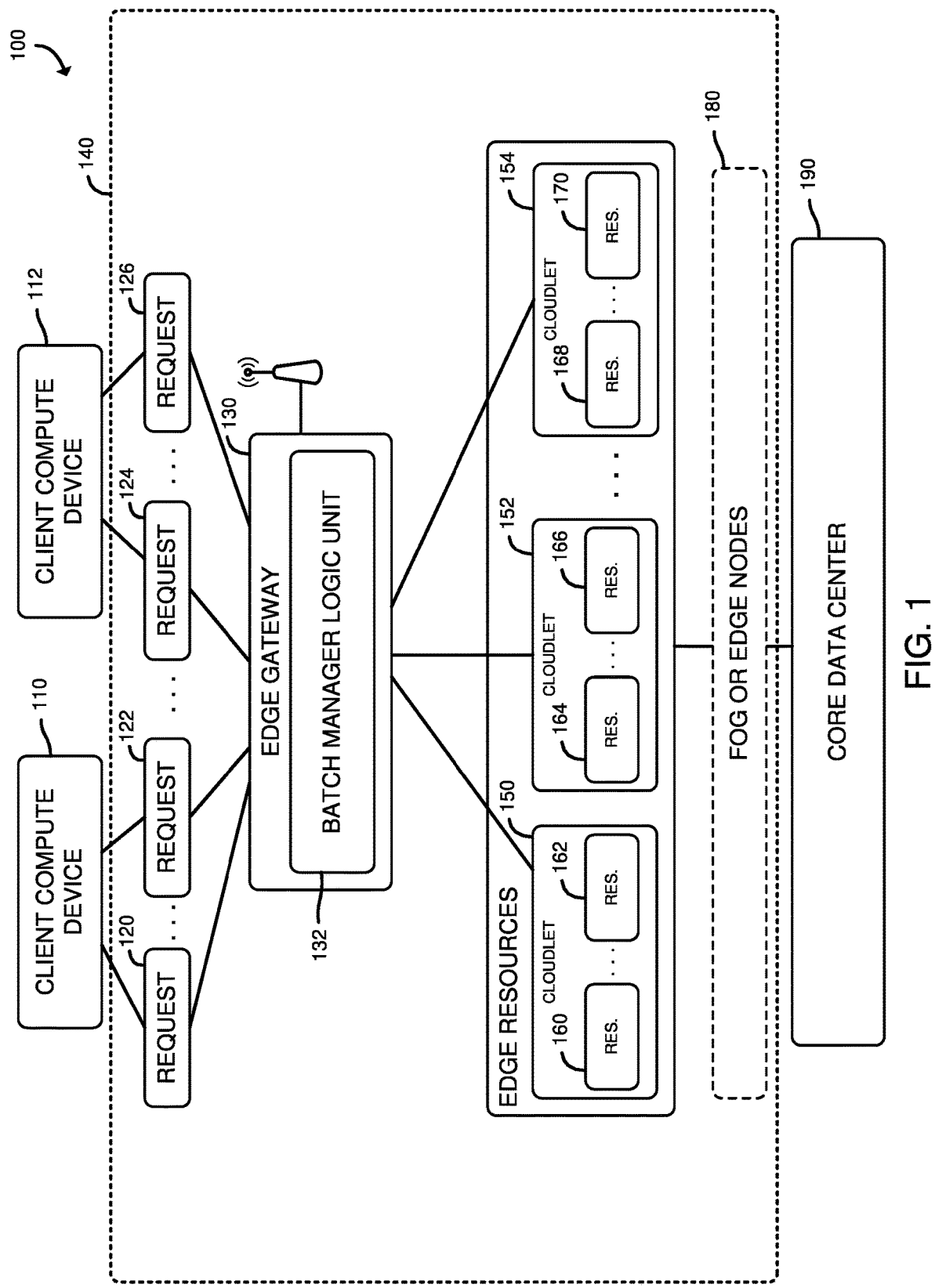
FIG. 1 is a simplified diagram of at least one embodiment of a system for batching requests in an edge infrastructure.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. Furthermore, the disclosed embodiments may be initially encoded as a set of preliminary instructions (e.g., encoded on a machine-readable storage medium) that may require preliminary processing operations to prepare the instructions for execution on a destination device. The preliminary processing may include combining the instructions with data present on a device, translating the instructions to a different format, performing compression, decompression, encryption, and/or decryption, combining multiple files that include different sections of the instructions, integrating the instructions with other code present on a device, such as a library, an operating system, etc., or similar operations. The preliminary processing may be performed by the source compute device (e.g., the device that is to send the instructions), the destination compute device (e.g., the device that is to execute the instructions), or an intermediary device. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, a system 100 for batching requests in an edge infrastructure includes a set of client compute devices 110, 112 in communication with an edge gateway 130. The edge gateway 130, in the illustrative embodiment, may be embodied as one or more physical compute devices or a virtualized system (e.g., one or more functions executed in a virtualized environment(s), such as virtual machine(s) or container(s), in which the underlying hardware resources appear as physical hardware to software executing in the virtualized environment(s), but are separated from the software by an abstraction layer). The edge gateway 130, in operation, is configured to communicate data between the client compute devices 110, 112 and one or more cloudlets 150, 152, 154, each of which includes a group of edge resources 160, 162, 164, 166, 168, 170 (e.g., resources, such as compute resources, accelerator resources, etc. owned and/or operated by one or more service providers, such as cellular network operators and which may be utilized in a virtualized environment, such as a virtual machine or a container), or other compute devices located in a cloud across edge locations (e.g., base stations, small cells, etc.). Each cloudlet 150, 152, 154 may provide an ability to execute operations associated with requests 120, 122, 124, 126 sent from the client compute devices 110, 112 (e.g., requests to perform operations, such as object recognition, speech recognition, etc.). Each request 120, 122, 124, 126 includes a set of parameters that define the operation(s) to be performed and performance target data (e.g., a latency target, such as a maximum amount of time that may elapse for the operation(s) to be completed, a target number of operations per second, a reference to a service level agreement (SLA) defining latency, bandwidth, throughput, and/or other targets to be satisfied, etc.), a priority associated with the request. In the illustrative embodiment, the edge gateway 130 includes a batch manager logic unit 132, which may be embodied as any device or circuitry (e.g., a co-processor, reconfigurable circuitry, a field programmable gate array (FPGA), an application specific integrated circuit (ASIC), etc.) or software configured to assign received requests to batches (e.g., groups of requests) and send batches of requests to corresponding cloudlets, rather than continually sending individual requests to cloudlets as they are received from the client compute devices 110, 112. In doing so, the batch manager logic unit 132 assigns the requests to corresponding batches based on the parameter(s) of the requests, such as the target latency, a target bandwidth, the types of operations to be performed to satisfy the requests, the types of resources that are to be utilized to perform the operations (e.g., to utilize specialized resources available at a particular cloudlet, to provide a hybrid of resource utilizations to avoid competition for the same resource, etc.) and dispatches the batches to cloudlets that are suited to (e.g., have available resources to execute) the requested operations. As described in more detail herein, the batch manager logic unit 132 may additionally identify patterns in requests received from the client compute devices 110, 112 and proactively notify the cloudlets to reserve resources to execute operations associated with requests that the batch manager logic unit 132 predicts, based on the identified patterns, will be received. Similarly, the batch manager logic unit 132 may identify patterns in resource utilizations of the cloudlets and may dispatch a batch to a cloudlet based on a prediction that the cloudlet will have underutilized (e.g., utilized less than a predefined percentage of available capacity, such as 90%) resources. Further, and as described in more detail herein, the batch manager logic unit 132 may receive batched responses from the cloudlets (e.g., output data produced as a result of performing the operations in the batches), disaggregate the batched responses, and send the individual responses to the corresponding client compute devices 110, 112. As such, unlike other systems in which requests are sent from an edge gateway individually to cloudlets that must utilize a large number of threads to shepherd work that comes in small units, the system 100 provides more efficient use of network traffic (e.g., sending a batch of related requests to be executed by the same cloudlet) and more dynamic load balancing (e.g., predicting resource utilization of the cloudlets based on identified patterns rather than reacting to resource utilization imbalances after they occur) than known edge systems.

As referenced above, the client compute devices 110, 112, the edge gateway 130, and the cloudlets 150, 152, 154, in the illustrative embodiment, are positioned at one or more locations (e.g., in small cell(s), base station(s), etc.) along the edge (e.g., in an edge network) of a cloud. An edge network may be embodied as any type of network that provides edge computing and/or storage resources which are proximately located to radio access network (RAN) capable endpoint devices (e.g., mobile computing devices, Internet of Things (IoT) devices, smart devices, etc.). In other words, the edge network is located at an "edge" between the endpoint devices and traditional mobile network access points that serves as an ingress point into service provider core networks, including carrier networks (e.g., Global System for Mobile Communications (GSM) networks, Long-Term Evolution (LTE) networks, 5G networks, etc.), while also providing storage and/or compute capabilities. Accordingly, the edge network can provide a radio access interface to enterprise applications (e.g., housed in a remote cloud, data center, etc.) and/or other network-based services, as well as bring storage/compute resources closer to the endpoint devices. As some computations/processing can be performed at the edge networks, efficiencies such as reduced latency, bandwidth, etc., can be realized (i.e., relative to such computations/processing being performed at a remote cloud, data center, etc.). Depending on the intended purpose/capabilities of the edge network, the edge network may include one or more edge computing devices, which may include one or more gateways, servers, mobile edge computing (MEC) appliances, etc. It should be appreciated that, in some embodiments, the edge network may form a portion of or otherwise provide an ingress point into a fog network (e.g., fog nodes 180), which may be embodied as a system-level horizontal architecture that distributes resources and services of computing, storage, control and networking anywhere between a core data center 182 and an endpoint device (e.g., the client compute device 110).

Figure 2:
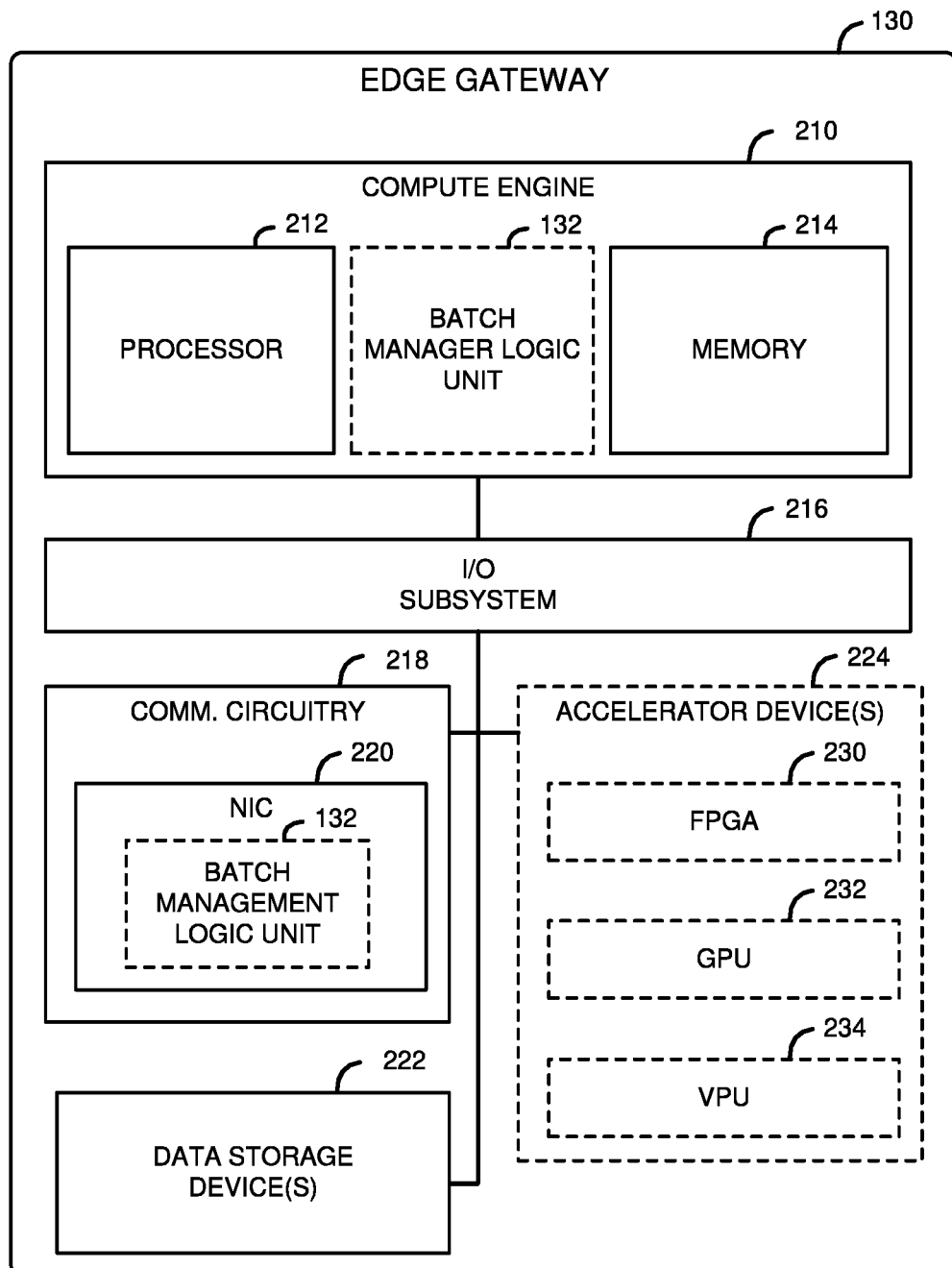
FIG. 2 is a simplified block diagram of at least one embodiment of an edge gateway included in the system of FIG. 1.

Referring now to FIG. 2, the illustrative edge gateway 130 includes a compute engine (also referred to herein as "compute engine circuitry") 210, an input/output (I/O) subsystem 216, communication circuitry 218, and one or more data storage devices 222. The edge gateway 130 may also include one or more accelerator devices 224. Of course, in other embodiments, the edge gateway 130 may include other or additional components, such as those commonly found in a computer (e.g., a display, peripheral devices, etc.). Additionally, in some embodiments, one or more of the illustrative components may be incorporated in, or otherwise form a portion of, another component. The compute engine 210 may be embodied as any type of device or collection of devices capable of performing various compute functions described below. In some embodiments, the compute engine 210 may be embodied as a single device such as an integrated circuit, an embedded system, a field-programmable gate array (FPGA), a system-on-a-chip (SOC), or other integrated system or device. In the illustrative embodiment, the compute engine 210 includes or is embodied as a processor 212, a memory 214, and the batch manager logic unit 132, described above with reference to FIG. 1. The processor 212 may be embodied as any type of processor capable of performing the functions described herein. For example, the processor 212 may be embodied as a multi-core processor(s), a microcontroller, or other processor or processing/controlling circuit. In some embodiments, the processor 212 may be embodied as, include, or be coupled to an FPGA, an application specific integrated circuit (ASIC), reconfigurable hardware or hardware circuitry, or other specialized hardware to facilitate performance of the functions described herein.

The main memory 214 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. Non-limiting examples of volatile memory may include various types of random access memory (RAM), such as dynamic random access memory (DRAM) or static random access memory (SRAM). One particular type of DRAM that may be used in a memory module is synchronous dynamic random access memory (SDRAM). In particular embodiments, DRAM of a memory component may comply with a standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces.

In one embodiment, the memory device is a block addressable memory device, such as those based on NAND or NOR technologies. A memory device may also include a three dimensional crosspoint memory device (e.g., Intel 3D XPoint™ memory), or other byte addressable write-in-place nonvolatile memory devices. In one embodiment, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. The memory device may refer to the die itself and/or to a packaged memory product.

In some embodiments, 3D crosspoint memory (e.g., Intel 3D XPoint™ memory) may comprise a transistor-less stackable cross point architecture in which memory cells sit at the intersection of word lines and bit lines and are individually addressable and in which bit storage is based on a change in bulk resistance. In some embodiments, all or a portion of the main memory 214 may be integrated into the processor 212. In operation, the main memory 214 may store various software and data used during operation such as one or more applications, data operated on by the application(s), libraries, and drivers.

The compute engine 210 is communicatively coupled to other components of the edge gateway 130 via the I/O subsystem 216, which may be embodied as circuitry and/or components to facilitate input/output operations with the compute engine 210 (e.g., with the processor 212, the main memory 214, and/or the batch manager logic unit 132) and other components of the edge gateway 130. For example, the I/O subsystem 216 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some embodiments, the I/O subsystem 216 may form a portion of a system-on-a-chip (SoC) and be incorporated, along with one or more of the processor 212, the main memory 214, and other components of the edge gateway 130, into the compute engine 210.

The communication circuitry 218 may be embodied as any communication circuit, device, or collection thereof, capable of enabling communications over a network between the edge gateway 130 and another compute device (e.g., the client compute devices 110, 112, the cloudlets 150, 152, 154, etc.). The communication circuitry 218 may be configured to use any one or more communication technology (e.g., wired or wireless communications) and associated protocols (e.g., a cellular networking protocol, Wi-Fi®, WiMAX, Ethernet, Bluetooth®, etc.) to effect such communication.

The illustrative communication circuitry 218 includes a network interface controller (NIC) 220, which may also be referred to as a host fabric interface (HFI). The NIC 220 may be embodied as one or more add-in-boards, daughter cards, network interface cards, controller chips, chipsets, or other devices that may be used by the edge gateway 130 to connect with another compute device (e.g., the client compute devices 110, 112, the cloudlets 150, 152, 154, etc.). In some embodiments, the NIC 220 may be embodied as part of a system-on-a-chip (SoC) that includes one or more processors, or included on a multichip package that also contains one or more processors. In some embodiments, the NIC 220 may include a local processor (not shown) and/or a local memory (not shown) that are both local to the NIC 220. In such embodiments, the local processor of the NIC 220 may be capable of performing one or more of the functions of the compute engine 210 described herein. Additionally or alternatively, in such embodiments, the local memory of the NIC 220 may be integrated into one or more components of the edge gateway 130 at the board level, socket level, chip level, and/or other levels. In some embodiments, and as indicated in FIG. 2, the batch manager logic unit 132 may be included in the NIC 220.

The one or more illustrative data storage devices 222 may be embodied as any type of devices configured for short-term or long-term storage of data such as, for example, memory devices and circuits, memory cards, hard disk drives, solid-state drives, or other data storage devices. Each data storage device 222 may include a system partition that stores data and firmware code for the data storage device 222. Each data storage device 222 may also include one or more operating system partitions that store data files and executables for operating systems.

Each accelerator device 224 may be embodied as any device or circuitry configured to execute a set of operations faster than the processor 212 is capable of executing the operations. The accelerator device(s) 224 may include one or more field programmable gate arrays (FPGAs) 230, each of which may be embodied as a set (e.g., a matrix) of logic gates that can be configured to perform a set of operations according to a defined configuration (e.g., a bit stream). The accelerator device(s) 224 may additionally or alternatively include a graphics processing unit (GPU) 232, which may be embodied as any device or circuitry (e.g., a programmable logic chip, a processor, etc.) configured to perform graphics-related computations (e.g., matrix multiplication, vector operations, etc.). Additionally or alternatively, the accelerator device(s) 224 may include a vision processing unit (VPU) 234, which may be embodied as any device or circuitry (e.g., a programmable logic chip, a processor, etc.) configured to perform operations related to machine vision, machine learning, and artificial intelligence. Additionally or alternatively the accelerator device(s) 224 may include other types of devices, such as one or more application specific integrated circuits (ASICs). While the batch manager logic unit 132 is shown as being incorporated into the compute engine 210 or the NIC 220, in some embodiments, the batch manager logic unit 132 may be included as or implemented by an accelerator device 224.

The client compute devices 110, 112, the cloudlets 150, 152, 154, the fog nodes 180, and the core data center 182 may have components similar to those described in FIG. 2 with reference to the edge gateway 130. The description of those components of the edge gateway 130 is equally applicable to the description of components of the client compute devices 110, 112, the cloudlets 150, 152, 154, the fog nodes 180, and the core data center 182, with the exception that, in some embodiments, the batch manager logic unit 132 is not included in devices other than the edge gateway 130. Further, it should be appreciated that any of the edge gateway 130, the client compute devices 110, 112, the cloudlets 150, 152, 154, the fog nodes 180, and the core data center 182 may include other components, sub-components, and devices commonly found in a computing device, which are not discussed above in reference to the edge gateway 130 and not discussed herein for clarity of the description. Further, it should be understood that one or more components of a compute device may be distributed across any distance, and are not necessarily housed in the same physical unit.

The client compute devices 110, 112, the edge gateway 130, the cloudlets 150, 152, 154, the fog nodes 180, and the core data center 182 are illustratively in communication via a network 140, which may be embodied as any type of wired or wireless communication network, or hybrids or combinations thereof, including global networks (e.g., the Internet), local area networks (LANs) or wide area networks (WANs), an edge network, a fog network, cellular networks (e.g., Global System for Mobile Communications (GSM), 3G, Long Term Evolution (LTE), Worldwide Interoperability for Microwave Access (WiMAX), etc.), a radio access network (RAN), digital subscriber line (DSL) networks, cable networks (e.g., coaxial networks, fiber networks, etc.), optical networks, or any combination thereof. While described herein in the context of an edge architecture, in other embodiments, the operations described herein may be performed by devices in a datacenter or other architecture.

Figure 3:
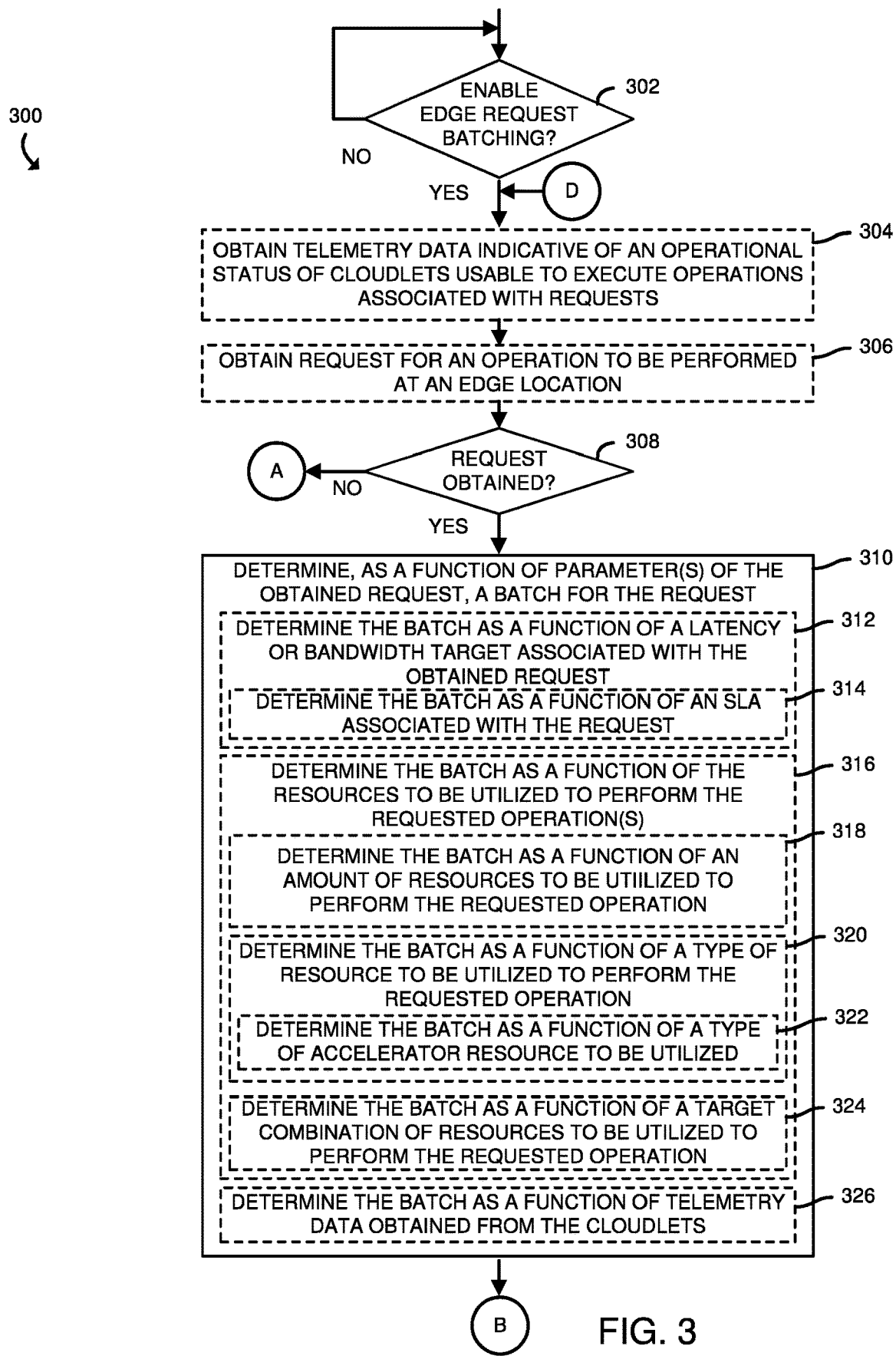
FIGS. 3-6 are simplified block diagrams of at least one embodiment of a method for batching requests in an edge infrastructure that may be performed by the edge gateway of FIG. 1.

Referring now to FIG. 3, the edge gateway 130, in operation, may execute a method 300 for batching requests in an edge infrastructure. The method 300 begins with block 302, in which the edge gateway 130 determines whether to enable edge request batching (e.g., batching of requests in the edge infrastructure). In the illustrative embodiment, the edge gateway 130 may determine to enable edge request batching in response to a determination that the edge gateway 130 is equipped with the batch manager logic unit 132, in response to determining that a configuration setting (e.g., stored in a configuration file in a data storage device 222) indicates to enable edge request batching, and/or based on other factors. Regardless, in response to a determination to enable edge request batching, the method 300 advances to block 304 in which the edge gateway 130 may obtain telemetry data indicative of an operational status (e.g., types of resources present, present utilization of each resource, etc.) of cloudlets (e.g., the cloudlets 150, 152, 154) that are usable to execute operations associated with requests (e.g., from client compute devices 110, 112). As indicated in block 306, the edge gateway 130 may obtain a request (e.g., from a client compute device 110, 112) for an operation to be performed at an edge location (e.g., by a cloudlet 150, 152, 154). In block 308, the edge gateway 130 determines the subsequent course of action based on whether a request was obtained in block 306. If so, the method 300 advances to block 310, in which the edge gateway 130 determines, as a function of one or more parameters of the obtained request, a batch for the obtained request (e.g., a batch that the obtained request is to be assigned to). In doing so, and as indicated in block 312, the edge gateway 130 may determine the batch as a function of a latency target (e.g., a maximum amount of time that may be spent to perform the operation) and/or a bandwidth target (e.g., a number of bytes per second to be processed or transmitted) associated with the obtained request. As indicated in block 314, the edge gateway 130 may determine the batch as a function of a service level agreement (SLA) (e.g., an agreement between a user and a provider of services at the edge to satisfy a set of performance targets) associated with the request (e.g., identified in the request using a unique identifier of the SLA, an SLA associated with an identifier of the client compute device 110, 112 that sent the request, etc.). In some embodiments, the edge gateway 130 may determine the batch as a function of a priority associated with the request (e.g., batch requests that have relatively high priorities into relatively small batches to increase the likelihood that the performance targets will be satisfied by the resources that are to execute the functions associated with the requests). As indicated in block 316, the edge gateway 130 may determine the batch as a function of the resources that are to be utilized to perform the requested operation. For example, and as indicated in block 318, the edge gateway 130 may determine the batch as a function of an amount of resources to be utilized to perform the requested operation (e.g., a number of processor cores, a number of instructions to be executed per second, etc.). The edge gateway 130 may determine the amount of resources to be utilized based on the type of operation to be executed and a data set (e.g., in the memory 214) indicative of amounts of different resources (e.g., compute, memory, etc.) typically required to execute that type of operation, based on metadata in the request that indicates the required amounts of resources of each type, and/or based on other factors. In block 320, the edge gateway 130 may determine the batch as a function of a type of resource to be utilized to perform the requested operation. For example, and as indicated in block 322, the edge gateway 130 may determine the batch as a function of a type of accelerator resource (e.g., an accelerator device 224, such as an FPGA, a GPU, a VPU, etc.) to be utilized to execute the operation. The type of resource may be identified in the request and/or the edge gateway 130 may reference a data set (e.g., in the memory 214) that indicates types of resources (e.g., types of accelerator resources) that are best suited to perform a given type of operation (e.g., the most efficiently in terms of power usage and speed). As indicated in block 324, the edge gateway 130 may determine the batch as a function of a target resource or combination of resources to be utilized to perform the requested operation. For example, the edge gateway 130 may determine to include the request in a batch that will be provided to a cloudlet having a particular type of resource (e.g., a GPU) to perform a group of operations that would all be executed more efficiently on that particular type of resource than on a general purpose processor. Additionally or alternatively, the edge gateway 130 may determine the batch to which the request should be assigned based on a policy to prevent competition for the same resource of a cloudlet (e.g., to produce a batch of operations in which one portion of the operations are memory intensive, another portion are compute intensive, and another portion are accelerator intensive). In some embodiments, the edge gateway 130 may determine the batch to which the request should be assigned as a function of telemetry data obtained from the cloudlets (e.g., the cloudlets 150, 152, 154), as indicated in block 326. For example, the edge gateway 130 may determine that, given the present utilization of the resources of the cloudlets 150, 152, 154, the batches should be kept relatively small (e.g., the maximum number of requests in a batch should not exceed a reference amount of requests) and, rather than adding the request to an existing batch, the edge gateway 130 should assign the request to a new batch. In some embodiments, the edge gateway 130 may determine that a request that is in a high performance tier (e.g., requires a relatively large amount of resources to execute) may be batched with a request that is in a low performance tier (e.g., requires a relatively small amount of resources to execute) if the total amount of resources needed by the combination does not exceed the available resources of a cloudlet.

Figure 4:
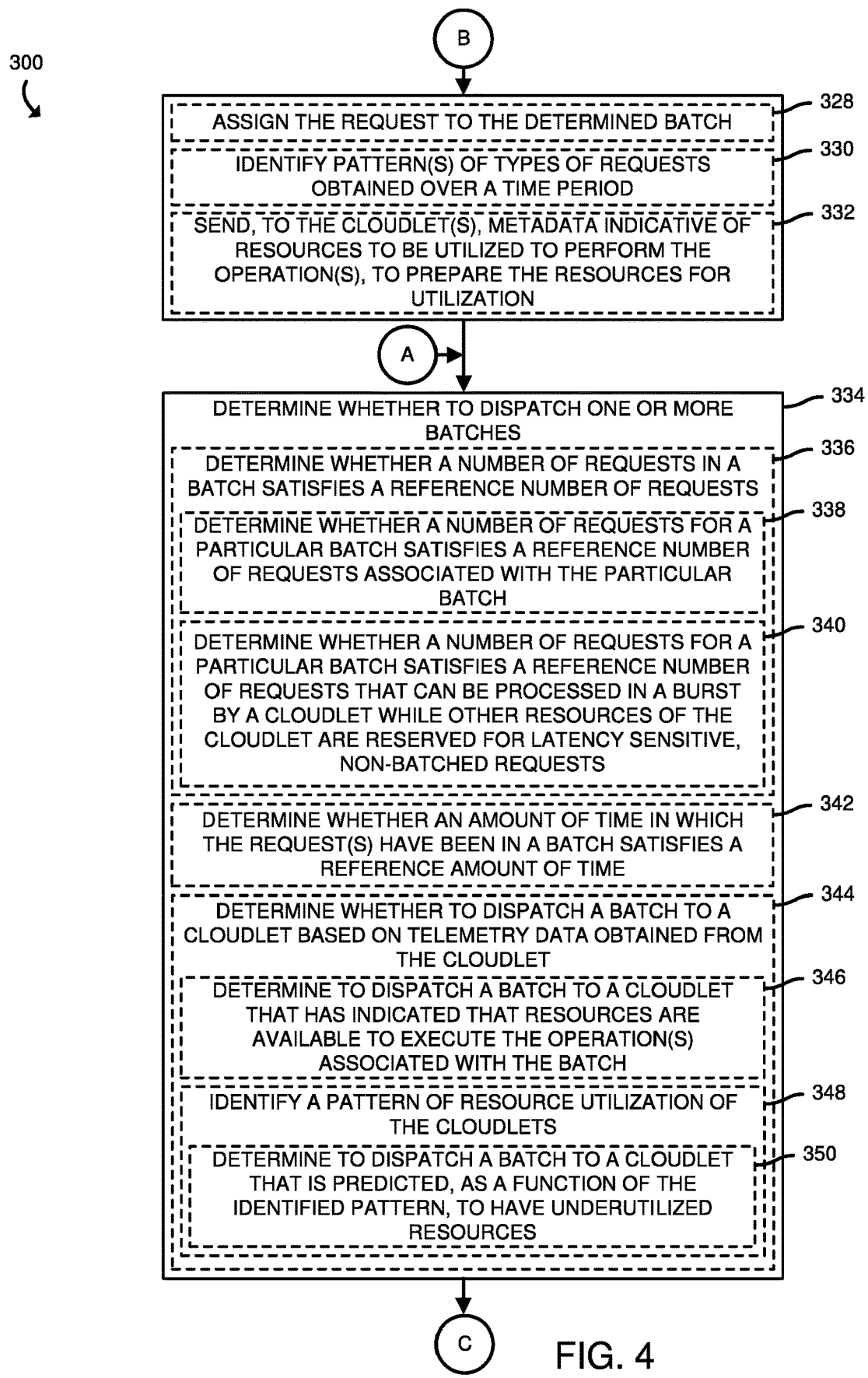

Referring now to FIG. 4, the edge gateway 130, in the illustrative embodiment, assigns the request to the determined batch (e.g., by associating, in the memory 214, an identifier of the request with an identifier of the determined batch), as indicated in block 328. In some embodiments, the system 100 may perform attestation of candidate service provider hosts, nodes, virtual machines, containers or environments or the like where the batch is supplied to the batch hosting environments, given that attestation evidence collected satisfies a trustworthiness policy (e.g., that all batch hosting environments for a given tenant workload use a trusted execution environment such as Intel SGX, virtual machine, or the like). In block 330, the edge gateway 130 may identify one or more patterns in the types of requests obtained (e.g., from the client compute devices 110, 112) over a time period. Further, and as indicated in block 332, in some embodiments, the edge gateway 130 may send, to one or more of the cloudlets 150, 152, 154, metadata indicative of resources to be utilized to perform the operations associated with the determined batch, to enable the cloudlet(s) to prepare (e.g., reserve) those resources for utilization. Subsequently, or if the edge gateway 130 determined in block 308 that no request was obtained, the method 300 advances to block 334, in which the edge gateway 130 determines whether to dispatch one or more batches. In doing so, and as indicated in block 336, the edge gateway 130 determines whether a number of requests in a batch satisfies a reference number (e.g., a predefined number) of requests. For example, and as indicated in block 338, the edge gateway 130 may determine whether the number of requests in a given batch satisfies a reference number of requests associated with (e.g., specific to) that particular batch (e.g., each batch may have a maximum size, based on the type of operations to be performed in the batch or other factors). In some embodiments, a target batch size may be defined by software (e.g., by management software). For example, a batch size of M may be defined for functions of a first type (e.g., having a particular performance target) and a batch size of N may be defined for functions of a second type (e.g., having a different performance target). As indicated in block 340, the edge gateway 130 may determine whether a number of requests for a particular batch satisfies a reference number of requests that can be processed in a burst by a portion of the resources of a cloudlet (e.g., a portion of the resources 160, 162 of the cloudlet 150) while other resources of the cloudlet are reserved for latency-sensitive, non-batched requests. In some embodiments, the edge gateway 130 may determine whether an amount of time in which a set of requests have been in a batch satisfies a reference amount of time (e.g., a maximum amount of time in which the requests may remain in a batch that has not yet been dispatched to a cloudlet for execution), as indicated in block 342. As indicated in block 344, the edge gateway 130 may determine whether to dispatch a batch to a cloudlet based on telemetry data obtained from the cloudlet. For example, and as indicated in block 346, the edge gateway 130 may determine to dispatch a batch to a cloudlet that has indicated that resources are available (e.g., reserved, presently have capacity, etc.) to execute the operations associated with the batch. As indicated in block 348, the edge gateway 130 may identify a pattern of resource utilization (e.g., using machine learning) of the cloudlets 150, 152, 154 (e.g., from the telemetry data obtained in block 304 of FIG. 3). Further, the edge gateway 130 may determine to dispatch a batch to a cloudlet that is predicted, as a function of the identified pattern, to have underutilized (e.g., utilized at less than a predefined percentage, such as 90%, of available capacity) resources, as indicated in block 350. Subsequently, the method 300 advances to block 352 of FIG. 5, in which the edge gateway 130 determines the subsequent course of action based on whether the edge gateway 130 has determined to dispatch one or more batches.

Figure 5:
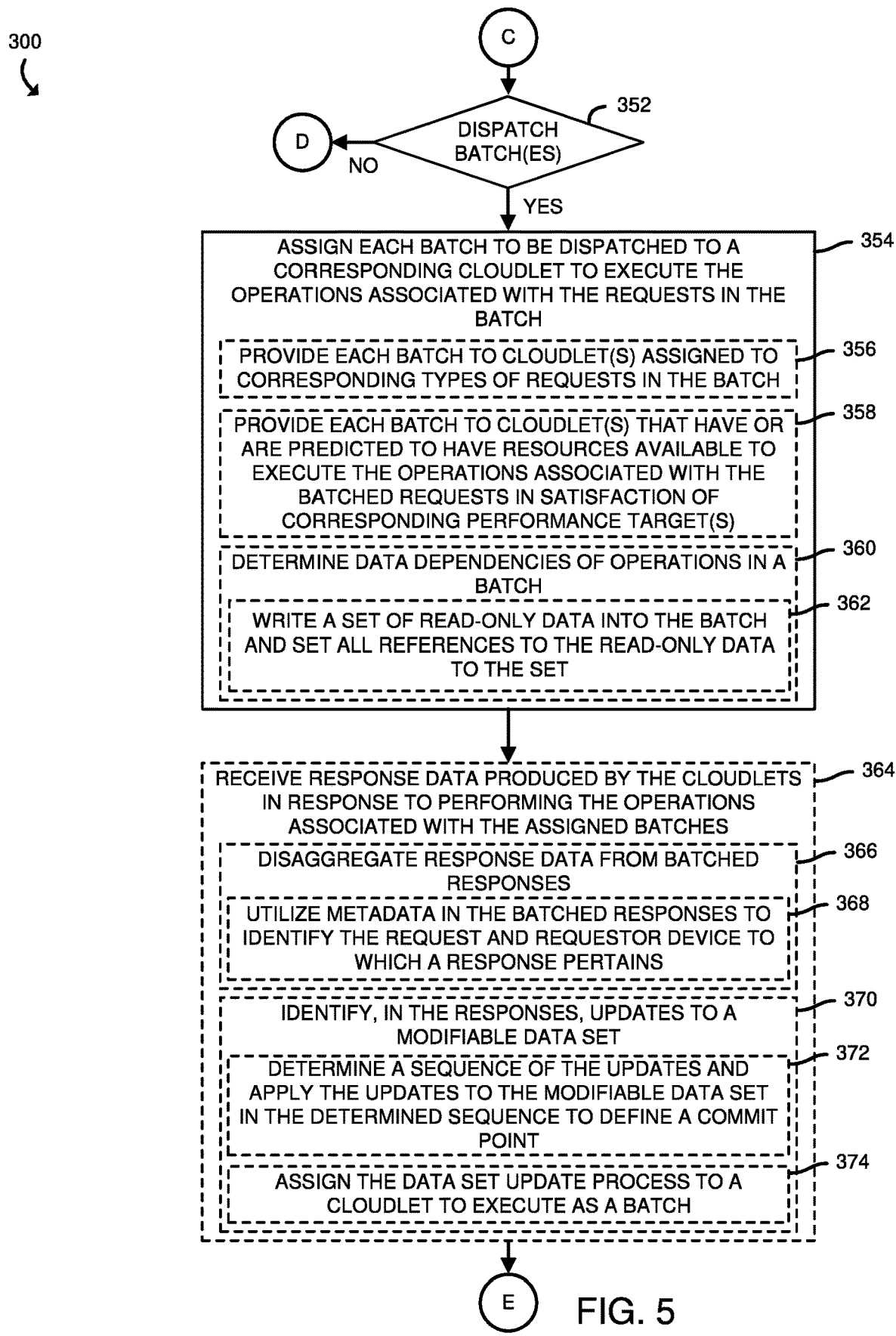

Referring now to FIG. 5, if the edge gateway 130 has determined not to dispatch one or more batches, the method 300 loops back to block 304 of FIG. 4, in which the edge gateway 130 may obtain additional telemetry data. Otherwise (e.g., if the edge gateway 130 has determined to dispatch one or more batches), the method 300 advances to block 354, in which the edge gateway 130 assigns each batch to be dispatched to a corresponding cloudlet (e.g., a cloudlet 150, 152, 154) to execute the operations associated with the requests in the corresponding batch. In doing so, and as indicated in block 356, the edge gateway 130 may provide each batch to a cloudlet configured to perform the type of operations associated with the requests in a particular batch (e.g., the cloudlet 150 may be configured with FPGAs having kernels for performing object detection in images, the cloudlet 152 may be configured with a relatively large amount of low-latency memory for performing fast updates to data sets, etc.). As indicated in block 358, the edge gateway 130 may provide each batch to a corresponding cloudlet that has or is predicted to have resources available to execute the operations associated with the batched requests in satisfaction of the corresponding performance target(s) (e.g., sufficient resources to satisfy a latency target or and/or a bandwidth target associated with the requests in a given batch). In block 360, the edge gateway 130 may determine data dependencies of operations associated with the requests in a batch (e.g., by reading metadata indicative of data sets that the operations are to access, by analyzing executable instructions defining the operations to identify instructions to access data sets, etc.). Further, and as indicated in block 362, the edge gateway 130 may write a set of read-only data into the batch and set all references to the read-only data to the one copy that was written into the batch (e.g., rather than each operation accessing a separate copy of the data). Subsequently, the method 300 advances to block 364, in which the edge gateway 130 may receive (e.g., from the cloudlets 150, 152, 154), response data (e.g., identifiers of objects present in a set of input images, data indicative of words identified in recordings of speech, etc.) produced by the cloudlets 150, 152, 154 in response to performing the operations associated with the assigned batches. In doing so, and as indicated in block 366, the edge gateway 130 may disaggregate response data from batched responses. For example, and as indicated in block 368, the edge gateway 130 may utilize metadata in the batched responses to identify the request and the requestor device (e.g., the client compute device 110, 112 that produced the request) to which a response pertains. For example, for each batched response, the metadata may define a request identifier (e.g., a universally unique identifier (UUID)) and may also include an identifier of the client compute device 110, 112 that originally sent the request to the edge gateway 130.

Figure 6:
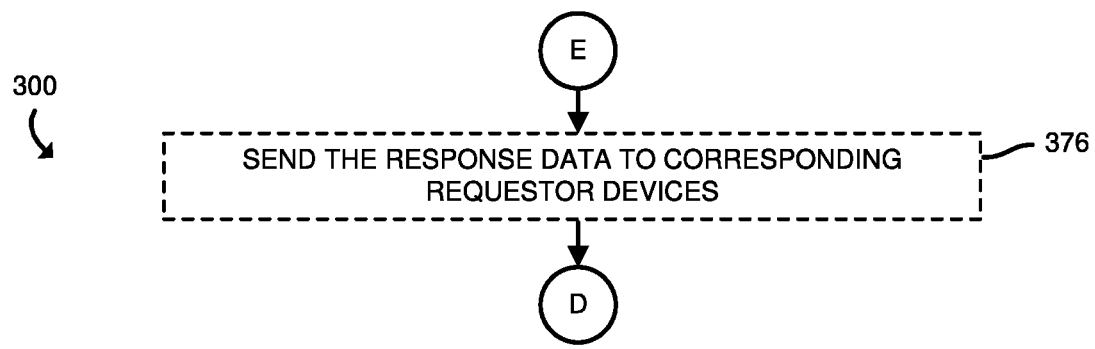

As indicated in block 370, the edge gateway 130 may identify, in the batched responses, updates to a modifiable data set. In block 372, the edge gateway 130 may identify a sequence of the updates (e.g., from timestamps associated with each update, from a sequence number associated with each update, etc.) and apply the updates to the modifiable data set in the determined sequence to define a commit point (e.g., a state of a data set in which a set of updates are guaranteed have been applied). In some embodiments, rather than determining the sequence and applying the updates itself, the edge gateway 130 instead assigns the data set update process to a cloudlet (e.g., one of the cloudlets 150, 152, 154) to execute as a batch, as indicated in block 374. Subsequently, the method 300 advances to block 376 of FIG. 6, in which the edge gateway 130 may send the response data (e.g., from block 364) to the corresponding requestor devices (e.g., the client compute devices 110, 112 that sent the corresponding requests to the edge gateway 130). Subsequently, the method 300 loops back to block 304 of FIG. 3 in which the edge gateway 130 may receive additional telemetry data and/or obtain another request from a client compute device 110, 112. While the operations of the method 300 are shown in a particular order in FIGS. 3-6, it should be understood that the operations may be performed in a different order or concurrently (e.g., assigning a request to a batch while concurrently dispatching another batch to a cloudlet).

Figure 7:
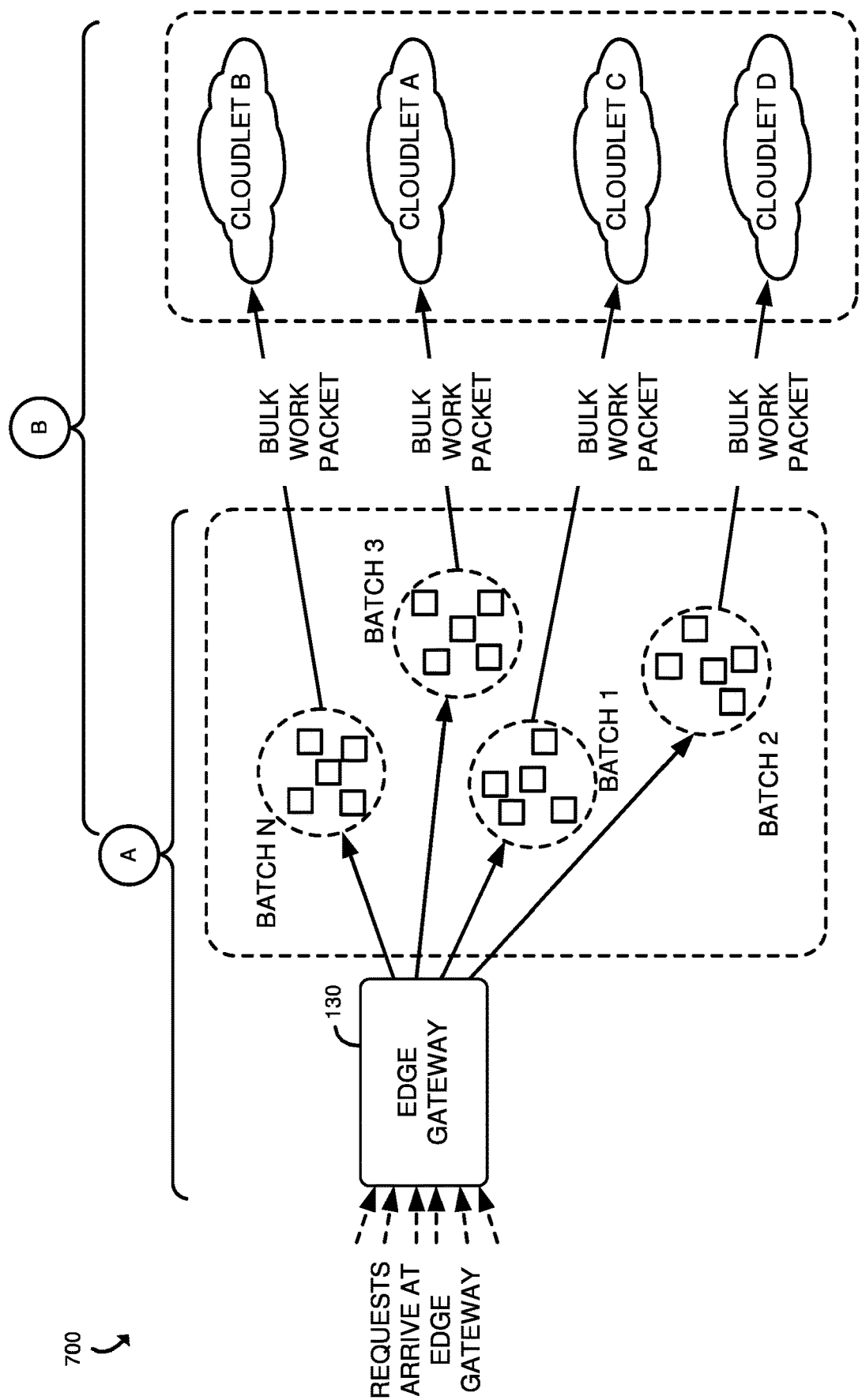
FIG. 7 is a simplified block diagram of at least one embodiment an architecture with data flow diagrams of the system of FIG. 1.
Figure 8:
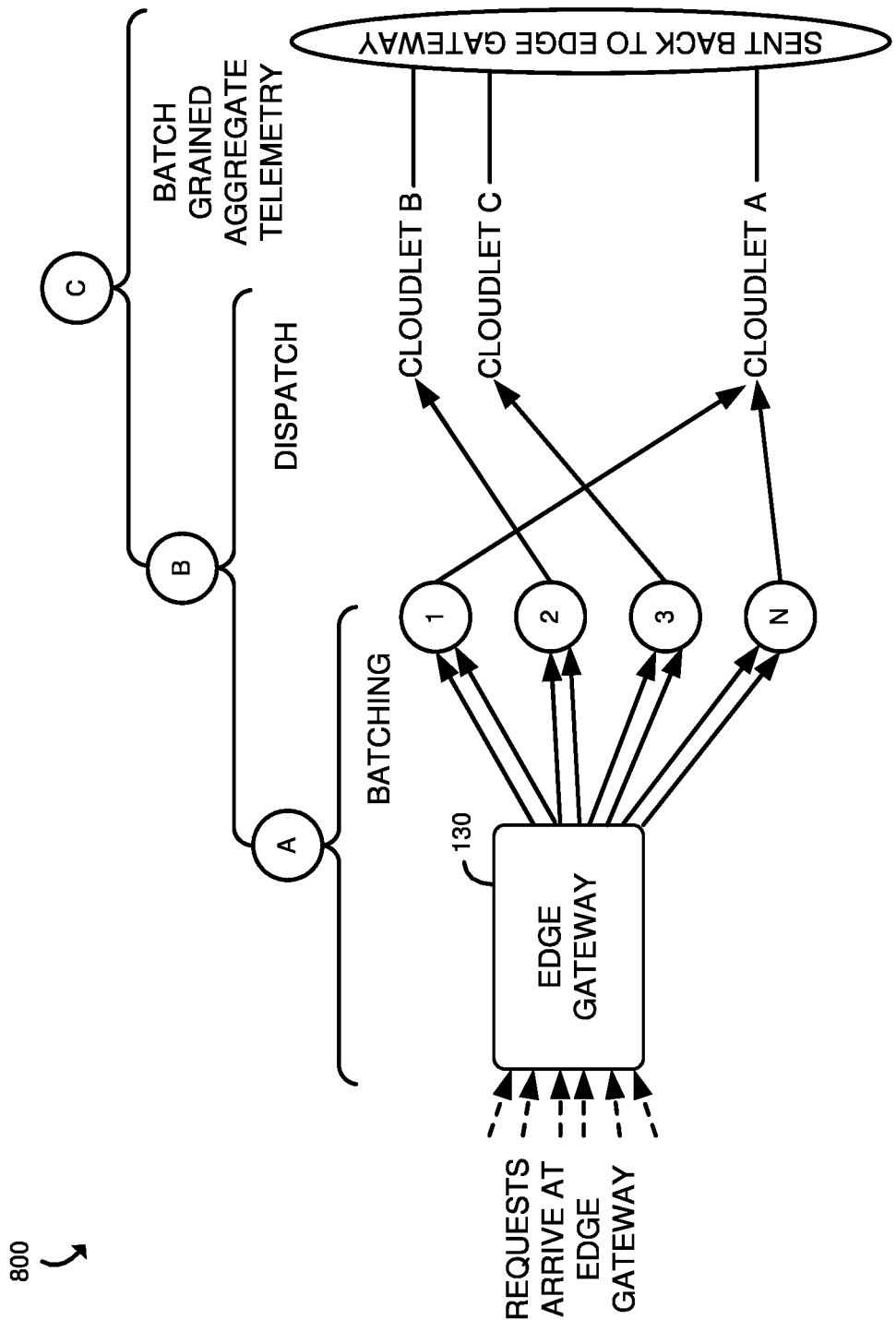
FIG. 8 is a simplified block diagram of at least one embodiment of another architecture of the system of FIG. 1 in which the edge gateway receives telemetry data from multiple cloudlets.

Referring now to FIG. 7, in an architecture 700 of the system 100, the edge gateway 130 concurrently aggregates requests into batches while dispatching other batches to cloudlets (e.g., as bulk work units). In some embodiments, the cloudlets are virtualized sets of resources (e.g., using virtualized environments, such as virtual machines or containers) that share host infrastructure. Further, in some embodiments, the cloudlets may utilize Intel Resource Director Technology (RDT) to guarantee minimum reserved resources and capacities (e.g., compute capacity, I/O capacity, memory bandwidth, etc.) to the received requests. Referring now to FIG. 8, in an architecture 800 of the system 100, the edge gateway 130 utilizes telemetry data to perform adaptive batching in real time. Once a batch is accepted as a work packet at a cloudlet (e.g., as shown above, batches 1 and n are taken in at cloudlet A), and execution proceeds, telemetry data is collected at the granularity of each batch and sent back to the course grained orchestrator (e.g., the edge gateway 130). Which cloudlet takes in which batch is thus dependent both on how the edge gateway 130 parses the telemetry data and performs the batching, and the characteristics of the batch as a whole. As such, batches 1 and n may bin-pack into cloudlet A's resource budgets and still comfortably meet the response time (e.g., latency) and resource consumption characteristics of the aggregated work across the two batches. In some embodiments, cloudlets may contain a reserved set of containers for executing only bulk work packets (e.g., batches) while some other cloudlets may not have such a policy and instead may create everything (e.g., containers) on demand.

Figure 9:
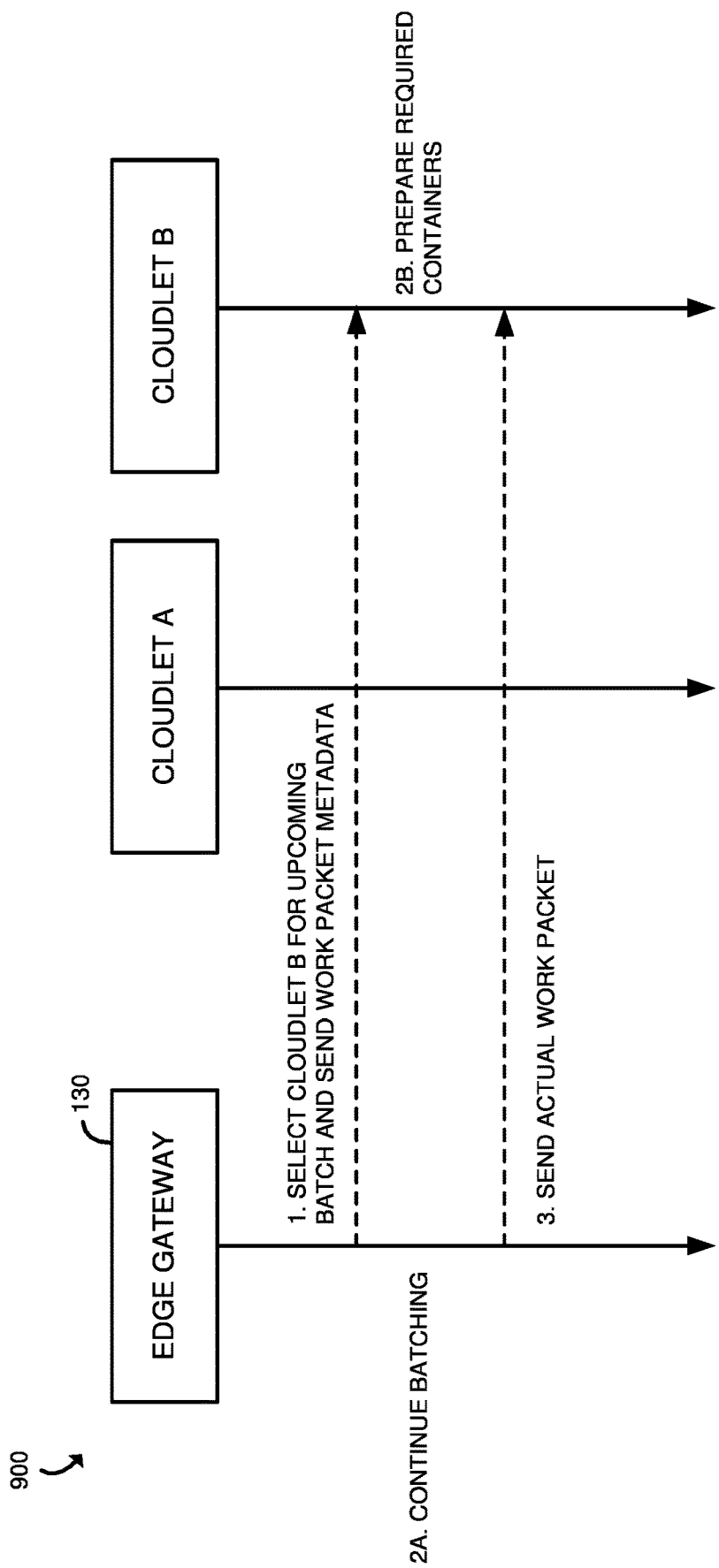
FIGS. 9-12 are simplified diagrams of data flows between the edge gateway and multiple cloudlets of the system of FIG. 1.
Figure 10:
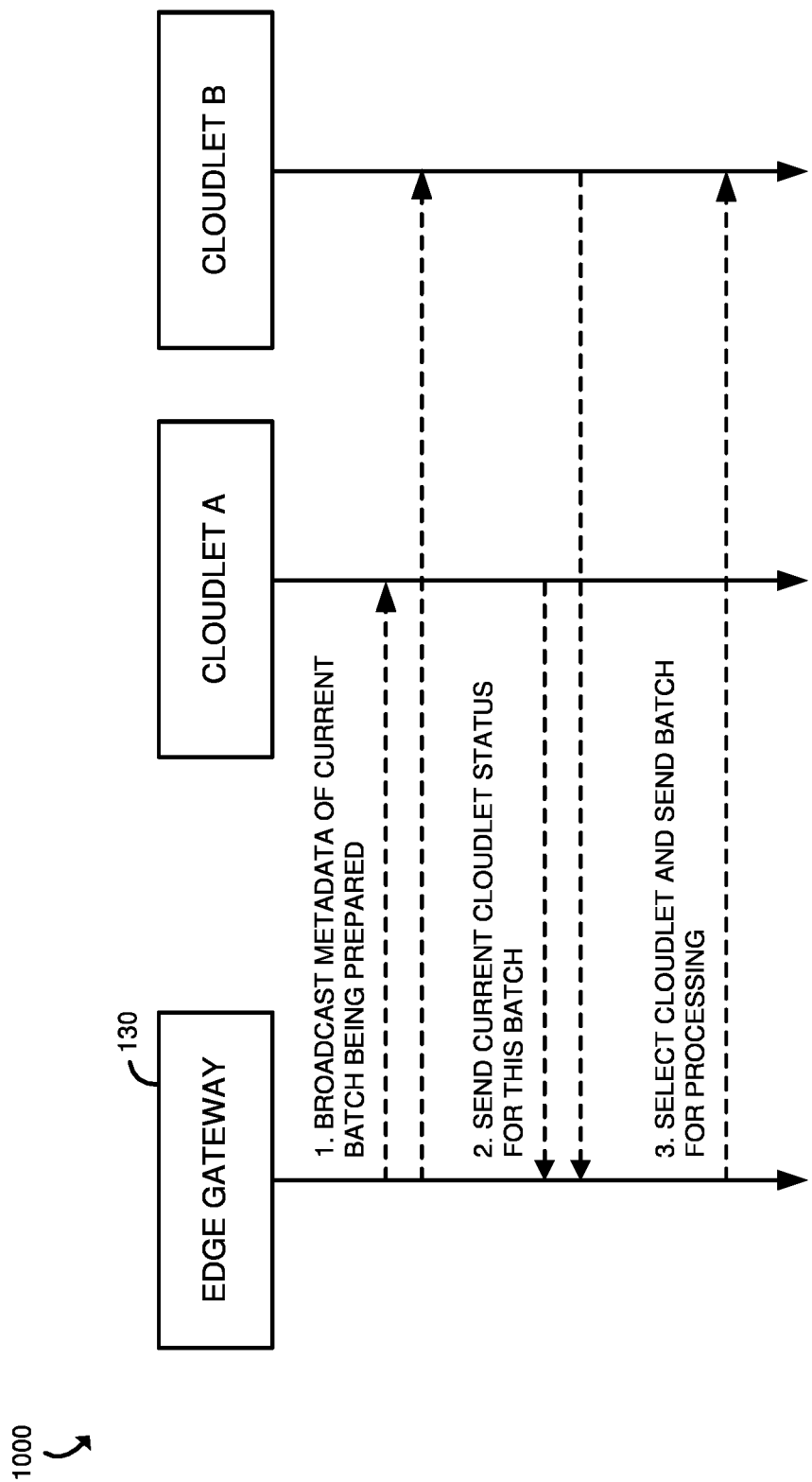

Referring now to FIG. 9, in a batch prefetching data flow 900, if a batch for a latency threshold of X and resource requirements of Y are in the process of creation at the edge gateway 130, the edge gateway 130 may send a prologue message to the cloudlet (e.g., cloudlet B) that should execute the work packet (e.g., the batch). In response, the cloudlet (e.g., cloudlet B) may begin allocating resources and preparing containers for the work packet (e.g., the batch). Referring now to FIG. 10, in a batch prefetching with broadcast data flow 1000, the edge gateway 130 broadcasts metadata (e.g., batch characteristics) of batches that are presently being prepared. The cloudlets may utilize the metadata to identify if the cloudlets already have containers available or to determine the cost of creating the containers for the batch. Subsequently, the cloudlets send status data to the edge gateway 130 and the edge gateway 130 determines the best destination (e.g., cloudlet) for the batch and sends the batch to the destination cloudlet when the batch is complete (e.g., ready to be processed by the cloudlet).

Figure 11:
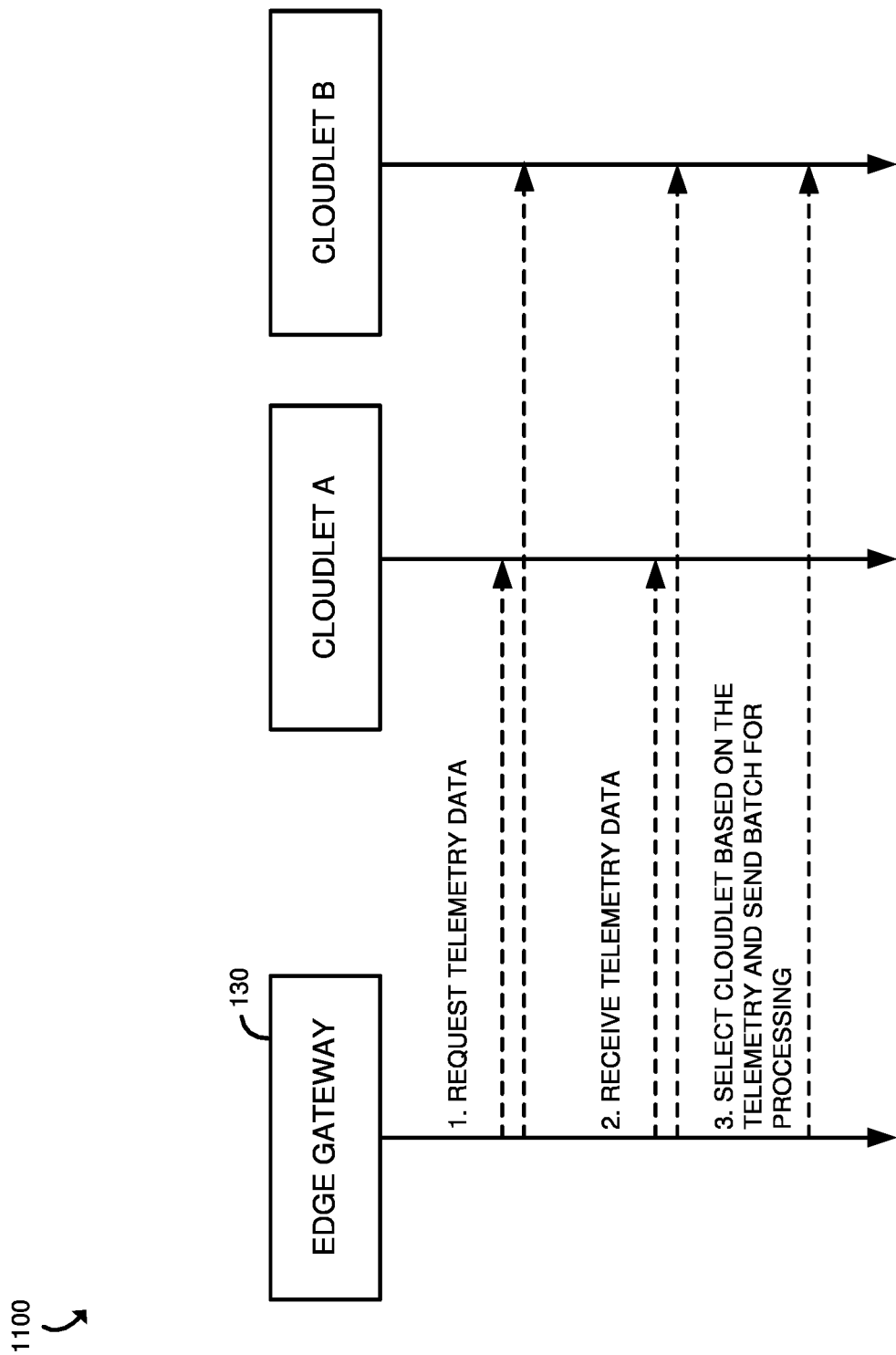
Figure 12:
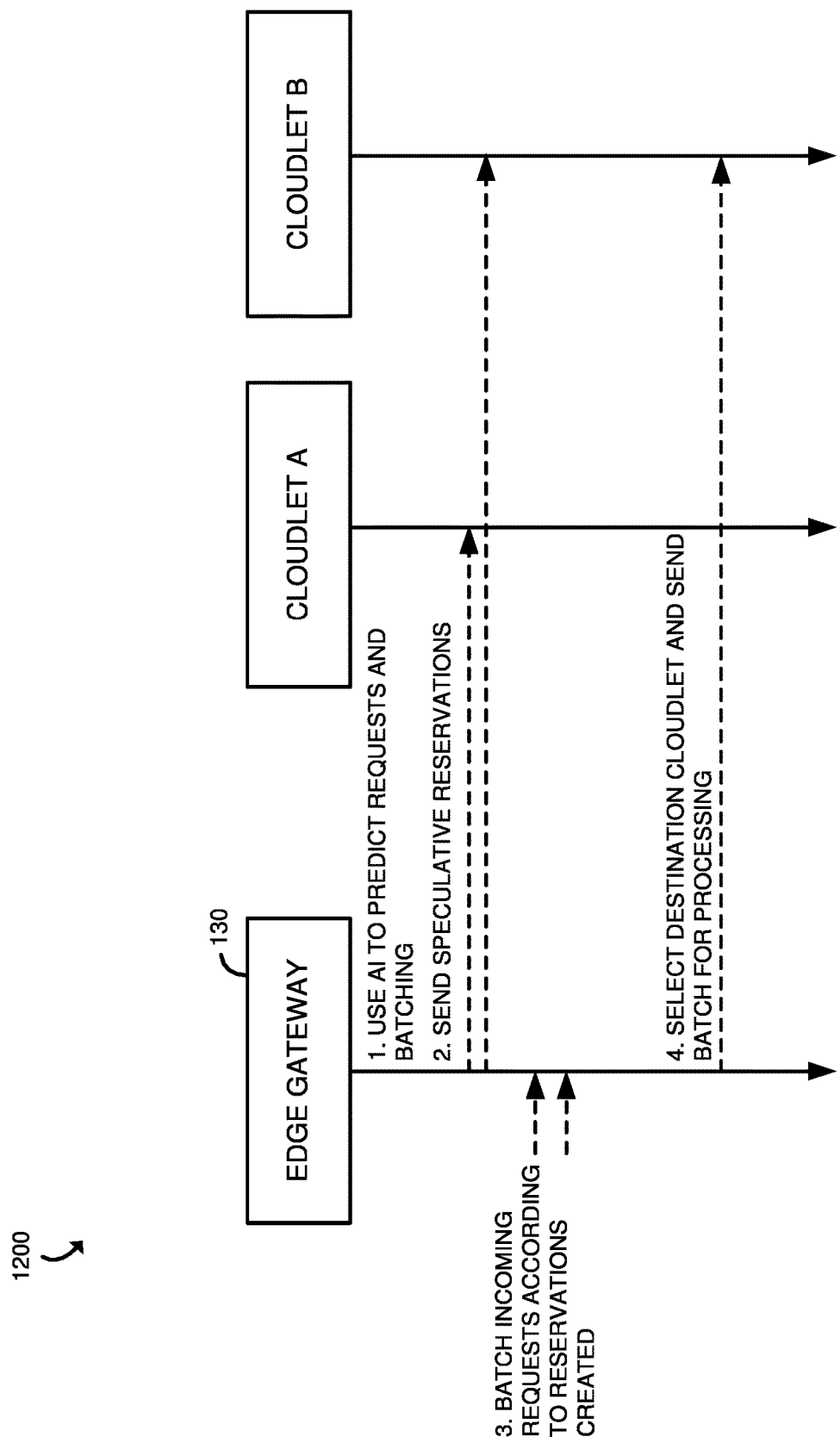

Referring now to FIG. 11, in a batching based on telemetry data flow 1100, the edge gateway 130 may request telemetry data from the cloudlets and utilize the received telemetry data to determine the types of batch to produce at a given point in time. In an artificial intelligence based predictive batching data flow 1200, shown in FIG. 12, the edge gateway 130 may utilize artificial intelligence learning (e.g., machine learning) to predict the type of request that may arrive at the edge gateway 130 at a particular point in time. With that prediction, the edge gateway 130 may instruct the cloudlets to reserve and create appropriate containers. A cloudlet may then utilize the already-created container(s) to execute the operations associated with the requests in a batch when the batch is sent to the cloudlet by the edge gateway 130. Further, the edge gateway 130 may utilize artificial intelligence (e.g., machine learning) to identify cycles and patterns in workload status changes that are correlated across different metadata topics. The edge gateway 130 may also perform an analysis to determine locations in cyclic patterns where resource underutilization (e.g., utilization of resources below a predefined available capacity, such as 90%) is present and may predict when underutilization is likely to happen. As such, the edge gateway 130 may produce and send batches to cloudlets to prevent predicted underutilizations from occurring.

Figure 13:
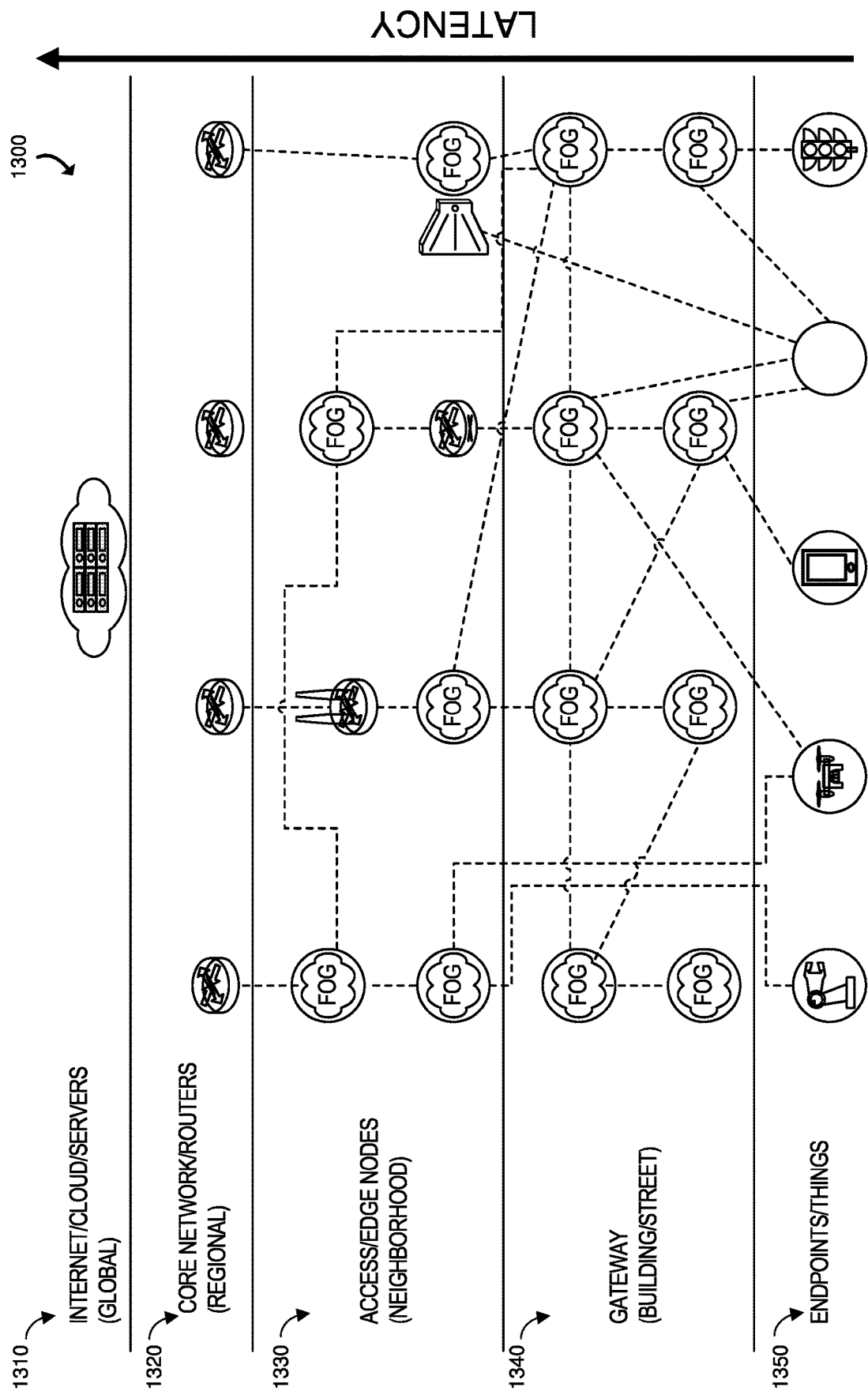
FIG. 13 is a simplified block diagram of a fog and mobile edge computing (MEC) network topology that may be utilized with the system of FIG. 1.

Referring briefly to FIG. 13, a MEC and fog network topology 1300 is shown. The network topology 1300 includes endpoints (at an endpoints/things network layer 1350), gateways (at a gateway layer 1340), access or edge computing nodes (e.g., at neighborhood nodes layer 1330), core network or routers (e.g., at a regional or central office layer 1320), and internet or cloud servers at a global layer 1310. A fog network (e.g., established at the gateway layer 1340) may represent a dense geographical distribution of near-user edge devices (e.g., fog nodes), equipped with storage capabilities (e.g., to avoid the need to store data in cloud data centers), communication capabilities (e.g., rather than routed over an internet backbone), control capabilities, configuration capabilities, measurement and management capabilities (rather than controlled primarily by network gateways such as those in an LTE core network), among others. In this context, FIG. 13 illustrates a general architecture that integrates a number of MEC and fog nodes—categorized in different layers (based on their position, connectivity and processing capabilities, etc.). It will be understood, however, that such fog nodes may be replaced or augmented by edge computing processing nodes.

Fog nodes may be categorized depending on the topology and the layer where they are located. In contrast, from a MEC standard perspective, each fog node may be considered as a mobile edge (ME) Host, or a simple entity hosting a ME app and a light-weighted ME Platform. In an example, a MEC or fog node may be defined as an application instance, connected to or running on a device (ME Host) that is hosting a ME Platform. As such, the application may consume MEC services and be associated to a ME Host in the system. The nodes may be migrated, associated to different ME Hosts, or consume MEC services from other (e.g., local or remote) ME platforms.

In contrast to using the edge, as described above, a traditional application may rely on remote cloud data storage and processing to exchange and coordinate information. A cloud data arrangement allows for long-term data collection and storage, but is not optimal for highly time varying data and may fail in attempting to meet latency challenges (e.g., stopping a vehicle when a child runs into the street). The use of the edge resources as described above enable providing services (e.g., execution of functions) in a low-latency manner (e.g., if requested), and, in some embodiments, may utilize features in existing MEC services that provide minimal overhead.

In addition to the MEC implementation described above, it should be appreciated that the foregoing systems and methods may be implemented in any environment (e.g., smart factories, smart cities, smart buildings, and the like) in which the devices are arranged and interoperate in a manner similar to that described with reference to FIG. 1, though the names of the individual devices may differ from one implementation to the next. For example, in a smart factory, the above systems and methods may improve the accuracy, efficiency, and/or safety with which one or more manufacturing operations are performed, particularly in instances in which the operations are to be performed in real time or near real time (e.g., in which low latency is of high importance). In a smart city, the above systems and methods may improve the accuracy, efficiency, and/or safety in the operation of traffic control systems, environmental monitoring systems, and/or other automated or semi-automated systems. Likewise, in a smart building, the above disclosure may be applied to improve the operations of any systems that rely on sensors to collect and act upon the collected information (e.g., threat detection and evacuation management systems, video monitoring systems, elevator control systems, etc.).

In some embodiments, one or more entities in the system 100, such as requests, parameters of requests, telemetry data, the edge gateway 130, the batch manager logic unit 132, the cloudlets 150, 152, 154, client compute devices, and/or other entities may be embodied as objects (e.g., common information model (CIM) objects, etc.). An object may be embodied as a set of data that defines parameters or characteristics of an entity. In some embodiments objects may be entities or collections of entities that are network addressable or have a unique identity (e.g., a certificate) or a group identity (e.g., a collection of resources that are working together and that are known to external entities as a collection with a common group name).

Examples

Illustrative examples of the technologies disclosed herein are provided below. An embodiment of the technologies may include any one or more, and any combination of, the examples described below.

Example 1 includes a compute device comprising circuitry to obtain a request for an operation to be performed at an edge location; determine, as a function of a parameter of the obtained request, a batch that the obtained request is to be assigned to, wherein the batch includes a one or more requests for operations to be performed at an edge location; and assign the batch to a cloudlet at an edge location, wherein the cloudlet includes a set of resources usable to execute the operations requested in the batch.

Example 2 includes the subject matter of Example 1, and wherein the circuitry is further to determine whether to dispatch the batch and wherein to assign the batch comprises to assign the batch in response to a determination to dispatch the batch.

Example 3 includes the subject matter of any of Examples 1 and 2, and wherein to determine whether to dispatch the batch comprises to determine whether a number of requests in the batch satisfies a reference number of requests.

Example 4 includes the subject matter of any of Examples 1-3, and wherein to determine whether to dispatch the batch comprises to determine whether an amount of time in which requests have been in the batch satisfies a reference amount of time.

Example 5 includes the subject matter of any of Examples 1-4, and wherein to determine whether to dispatch the batch comprises to determine whether to dispatch the batch based on telemetry data obtained from the cloudlet.

Example 6 includes the subject matter of any of Examples 1-5, and wherein the circuitry is further to identify, as a function of the telemetry data, a pattern of resource utilization of the cloudlet and wherein to determine whether to dispatch the batch comprises to determine to dispatch the batch to the cloudlet in response to a determination that the cloudlet is predicted, as a function of the identified pattern, to have underutilized resources.

Example 7 includes the subject matter of any of Examples 1-6, and wherein to determine, as a function of a parameter of the obtained request, a batch that the obtained requests is to be assigned to comprises to determine the batch as a function of a latency target or a bandwidth target associated with the obtained request.

Example 8 includes the subject matter of any of Examples 1-7, and wherein to determine, as a function of a parameter of the obtained request, a batch that the obtained request is to be assigned to comprises to determine the batch as a function of one or more resources to be utilized to perform the operation.

Example 9 includes the subject matter of any of Examples 1-8, and wherein the cloudlet is one of a plurality of cloudlets, and wherein to determine, as a function of a parameter of the obtained request, a batch that the obtained request is to be assigned to comprises to determine the batch as a function of telemetry data obtained from the plurality of cloudlets.

Example 10 includes the subject matter of any of Examples 1-9, and wherein to determine whether to dispatch the batch comprises to determine whether a number of requests in the batch satisfies a reference number of requests that can be processed in a burst by a portion of the resources in the cloudlet while other resources of the cloudlet are reserved for requests that are not in a batch.

Example 11 includes the subject matter of any of Examples 1-10, and wherein the circuitry is further to receive batched responses produced by the cloudlet in response to performing the operations in the batch; and utilize metadata in the batched responses to identify a corresponding request to which a batched response pertains.

Example 12 includes the subject matter of any of Examples 1-11, and wherein the circuitry is further to send each batched response to a corresponding requestor device.

Example 13 includes a method comprising obtaining, by a compute device, a request for an operation to be performed at an edge location; determining, by the compute device and as a function of a parameter of the obtained request, a batch that the obtained request is to be assigned to, wherein the batch includes a one or more requests for operations to be performed at an edge location; and assigning, by the compute device, the batch to a cloudlet at an edge location, wherein the cloudlet includes a set of resources usable to execute the operations requested in the batch.

Example 14 includes the subject matter of Example 13, and further including determining, by the compute device, whether to dispatch the batch and wherein to assign the batch comprises to assign the batch in response to a determination to dispatch the batch.

Example 15 includes the subject matter of any of Examples 13 and 14, and wherein determining whether to dispatch the batch comprises determining whether a number of requests in the batch satisfies a reference number of requests.

Example 16 includes the subject matter of any of Examples 13-15, and wherein determining whether to dispatch the batch comprises determining whether an amount of time in which requests have been in the batch satisfies a reference amount of time.

Example 17 includes the subject matter of any of Examples 13-16, and wherein determining whether to dispatch the batch comprises determining whether to dispatch the batch based on telemetry data obtained from the cloudlet.

Example 18 includes the subject matter of any of Examples 13-17, and wherein the parameter is an object.

Example 19 includes one or more machine-readable storage media comprising a plurality of instructions stored thereon that, in response to being executed, cause a device to obtain a request for an operation to be performed at a location; determine, as a function of a parameter of the obtained request, a batch that the obtained request is to be assigned to, wherein the batch includes one or more requests for operations to be performed at a location; and assign the batch to a cloudlet at a location, wherein the cloudlet includes a set of resources usable to execute the operations requested in the batch.

Example 20 includes the subject matter of Example 19, and wherein the plurality of instructions further cause the device to determine whether to dispatch the batch and wherein to assign the batch comprises to assign the batch in response to a determination to dispatch the batch.

What is claimed is:

1. A compute device comprising:
   at least one memory; and
   processor circuitry to:
   obtain a request for an operation to be performed at an edge location;
   generate, as a function of a parameter of the obtained request, a first batch that the obtained request is to be assigned to, wherein the first batch includes a one or more requests for operations to be performed at an edge location;
   determine whether to dispatch the first batch, the determination based on whether a number of requests in the first batch satisfies a reference number of requests that can be processed in a burst by an amount of resources included in a cloudlet at an edge location, the cloudlet to include other resources reserved for requests that are not in the first batch;
   in response to a determination that the first batch is to be dispatched, assign the first batch to the cloudlet; and
   in response to a determination that the first batch is to not be dispatched, generate, as a function of a parameter of the obtained request, a second batch to which the obtained request is to be assigned.

2. The compute device of claim 1, wherein to determine whether to dispatch the first batch, the processor circuitry is further to determine whether a number of requests in the first batch satisfies a reference number of requests.

3. The compute device of claim 1, wherein to determine whether to dispatch the first batch, the processor circuitry is further to determine whether an amount of time in which requests have been in the batch satisfies a reference amount of time.

4. The compute device of claim 1, wherein to determine whether to dispatch the first batch, the processor circuitry is further to determine whether to dispatch the batch based on telemetry data obtained from the cloudlet.

5. The compute device of claim 4, wherein the circuitry is further to identify, as a function of the telemetry data, a pattern of resource utilization of the cloudlet and wherein to determine whether to dispatch the first batch, the processor circuitry is further to determine to dispatch the batch to the cloudlet in response to a determination that the cloudlet is predicted, as a function of the identified pattern, to have underutilized resources.

6. The compute device of claim 1, wherein to determine, as a function of a parameter of the obtained request, a first batch that the obtained requests is to be assigned to, the processor circuitry is further to determine the batch as a function of a latency target or a bandwidth target associated with the obtained request.

7. The compute device of claim 1, wherein to determine, as a function of a parameter of the obtained request, a first batch that the obtained request is to be assigned to, the processor circuitry is further to determine the batch as a function of one or more resources to be utilized to perform the operation.

8. The compute device of claim 1, wherein the cloudlet is one of a plurality of cloudlets, and wherein to determine, as a function of a parameter of the obtained request, a first batch that the obtained request is to be assigned to, the processor circuitry is further to determine the batch as a function of telemetry data obtained from the plurality of cloudlets.

9. The compute device of claim 1, wherein the processor circuitry is further to:
   receive batched responses produced by the cloudlet in response to performing the operations in the first batch; and
   utilize metadata in the batched responses to identify a corresponding request to which a batched response pertains.

10. The compute device of claim 9, wherein the circuitry is further to send each batched response to a corresponding requestor device.

11. A method comprising:
  obtaining, by a compute device, a request for an operation to be performed at an edge location;
  generating, by the compute device and as a function of a parameter of the obtained request, a first batch that the obtained request is to be assigned to, wherein the first batch includes a one or more requests for operations to be performed at an edge location;
  determining whether to dispatch the first batch, the determination to include whether a number of requests in the first batch satisfies a reference number of requests that can be processed in a burst by an amount of resources included in a cloudlet at an edge location, the cloudlet to include other resources reserved for requests that are not in the first batch;
  in response to a determination that the first batch is to be dispatched, assigning, by the compute device, the first batch to the cloudlet; and
  in response to a determination that the first batch is not to be dispatched, generating, by the compute device and as a function of a parameter of the obtained request, a second batch to which the obtained request is to be assigned.

12. The method of claim 11, wherein determining whether to dispatch the first batch includes determining whether a number of requests in the first batch satisfies a reference number of requests.

13. The method of claim 11, wherein the determining of whether to dispatch the first batch includes determining whether an amount of time in which requests have been in the batch satisfies a reference amount of time.

14. The method of claim 11, wherein the determining of whether to dispatch the first batch includes determining whether to dispatch the batch on telemetry data obtained from the cloudlet.

15. The method of claim 11, wherein the parameter is an object.

16. One or more non-transitory machine-readable storage media comprising a plurality of instructions stored thereon that, in response to being executed, cause a device to:
  obtain a request for an operation to be performed at a location;
  generate, as a function of a parameter of the obtained request, a first batch that the obtained request is to be assigned to, wherein the first batch includes a one or more requests for operations to be performed at an edge location;
  determine whether to dispatch the first batch, the determination to include whether a number of requests in the first batch satisfies a reference number of requests that can be processed in a burst by an amount of resources included in a cloudlet at an edge location, the cloudlet to include other resources reserved for requests that are not in the first batch;
  in response to a determination that the first batch is to be dispatched, assign the first batch to the cloudlet; and
  in response to a determination that the first batch is not to be dispatched, generate, as a function of a parameter of the obtained request, a second batch that the obtained request is to be assigned to.

17. The one or more non-transitory machine-readable storage media of claim 16, wherein to determine whether to dispatch the first batch, the plurality of instructions, when executed, cause the device to determine whether a number of requests in the first batch satisfies a reference number of requests.

* * * * *